United States Patent [19]
Bochnak et al.

[11] 3,791,775
[45] Feb. 12, 1974

[54] HYDRAULIC FLUID SUPPLY APPARATUS FOR A HYDRAULIC SERVOMECHANISM

[75] Inventors: Gregory Bochnak; Roderick A. MacLennan, both of Stratford, Conn.

[73] Assignee: United Aircraft Corporation, East Hartford, Conn.

[22] Filed: June 19, 1972

[21] Appl. No.: 263,884

[52] U.S. Cl. .................................. 417/426, 60/405
[51] Int. Cl. ...................... F04b 41/06, F04b 23/04
[58] Field of Search ..................................... 60/405; 417/426–429

[56] References Cited
UNITED STATES PATENTS

| | | | |
|---|---|---|---|
| 3,407,894 | 10/1968 | Thompson | 60/405 |
| 3,456,881 | 7/1969 | Beitler | 417/428 |
| 2,897,786 | 8/1959 | Geyer | 60/405 |
| 3,279,558 | 10/1966 | Allen et al. | 60/405 |
| 2,747,508 | 5/1956 | Neil | 417/426 |
| 2,817,396 | 12/1957 | Booth | 417/428 |
| 3,653,209 | 4/1972 | MacDuff | 60/405 |
| 2,643,516 | 6/1953 | Carlson | 60/405 |

*Primary Examiner*—William L. Freeh
*Attorney, Agent, or Firm*—Russell M. Lipes, Jr.

[57] ABSTRACT

Under normal operating conditions a primary pump and a primary reservoir comprise the hydraulic fluid supply apparatus for each of two stages of a hydraulic servomechanism. A transfer valve is responsive to the difference of the hydraulic fluid pressures of each primary pump and an auxiliary pump. A failure which causes a reduction in the pressure provided by either or both primary pumps causes the connection of the auxiliary pump and an auxiliary reservoir to the respective stage.

5 Claims, 3 Drawing Figures

HYDRAULIC FLUID SUPPLY APPARATUS FOR A HYDRAULIC SERVOMECHANISM

BACKGROUND OF THE INVENTION

1. Field of the Invention

This invention relates to hydraulic servomechanisms, and more particularly to an auxiliary fluid supply apparatus for a hydraulic servo and means for connecting the apparatus.

2. Description of the Prior Art

Hydraulic servos are commonly used in apparatus for positioning control surfaces of an aircraft and also usually comprise the power steering mechanism of an automobile.

Among the advantages of a hydraulic servo is its high reliability. The failure of the servo to operate is usually due to the loss of pressure in the hydraulic fluid which is pumped within the servo; there is seldom failure of the servo itself. The loss of pressure is usually caused by a failure of a hydraulic fluid supply apparatus such as a pump.

The impact of failure is often minimized by additionally providing an auxiliary servo, with a separate auxiliary fluid supply apparatus and a failure sensing apparatus which senses the pressure in the hydraulic fluid. In response to a failure, the sensing apparatus automatically causes the replacement of the primary servo and the primary fluid supply apparatus by the auxiliary servo and its auxiliary fluid supply apparatus.

The provision of a failure sensing apparatus and an auxiliary servo is complex and wasteful since most failures are attributable to the fluid supply apparatus.

SUMMARY OF THE INVENTION

The object of the present invention is to maintain the operation of a hydraulic servo when there is failure of the hydraulic fluid supply apparatus associated therewith.

According to the present invention, a reduction of the pressure in the hydraulic fluid supplied to either stage of a two-stage servo by a primary fluid supply apparatus is sensed by a valve which simultaneously causes the connection of an auxiliary hydraulic fluid supply apparatus to the servo and a disconnection of the primary supply apparatus while maintaining complete isolation between the supplies.

The present invention provides a means for automatically connecting an independent auxiliary hydraulic fluid supply apparatus to a multistage power servo when there is a failure of one or more of the primary hydraulic fluid supplies to the servo to provide a hydraulic fluid pressure above a predetermined pressure. Hydraulic servo systems may be provided which are simple and reliable without the redundancy used in the prior art.

Other objects, features and advantages of the present invention will become more apparent in the light of the following detailed description of a preferred embodiment thereof as illustrated in the accompanying drawing.

DESCRIPTION OF THE PREFERRED EMBODIMENT

Figure 1:
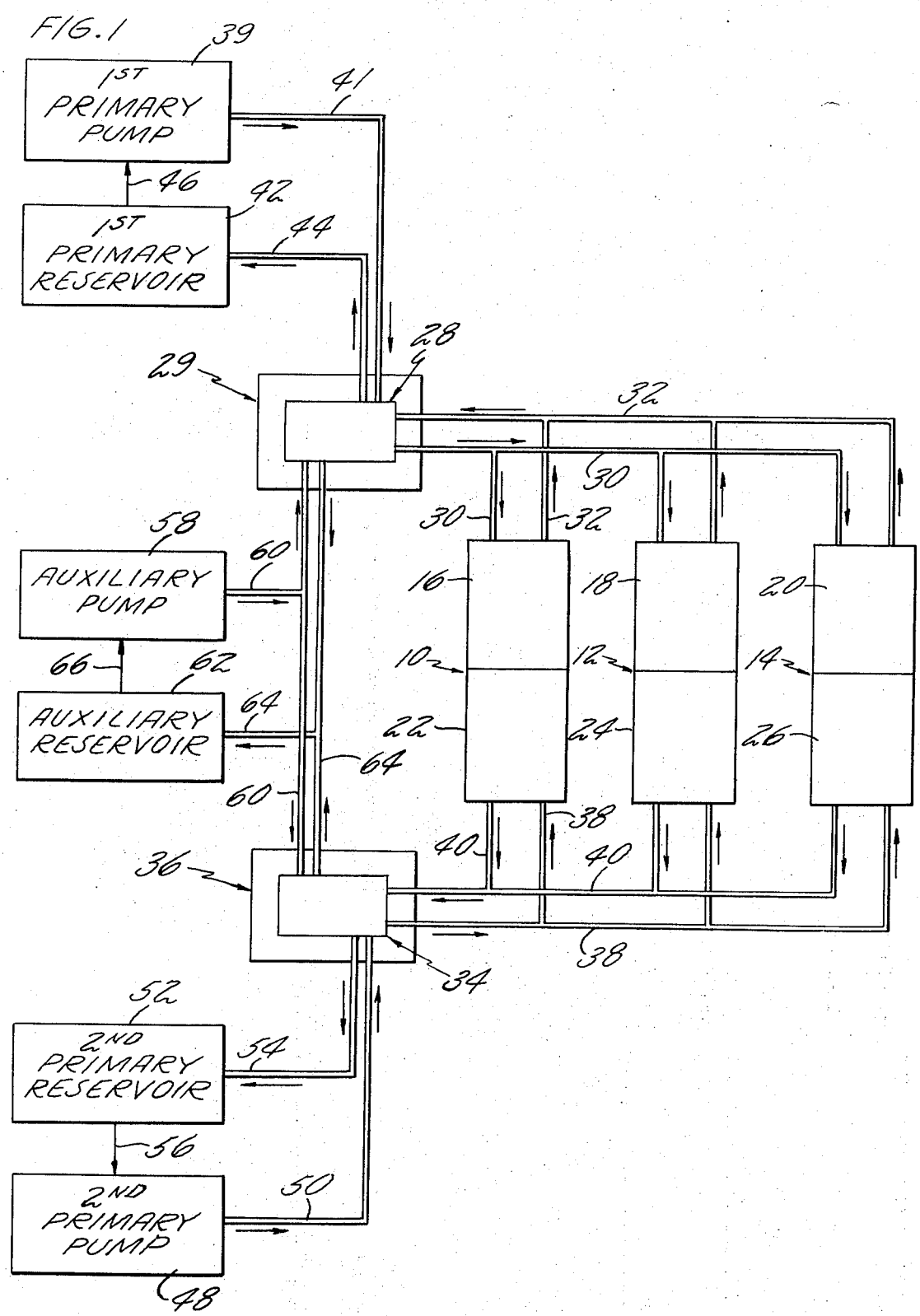
FIG. 1 is a schematic block diagram of the preferred embodiment of the present invention.

Referring now to FIG. 1, hydraulic servos 10, 12, 14 respectively include first stages 16, 18, 20 and second stages 22, 24, 26, each of the stages being hydraulic amplifiers, analogous to electronic amplifiers. Although a servo may be comprised of many stages, only servos with two stages are included in the preferred embodiment. The servos 10, 12, 14 may be used for providing force to actuate the control linkages of the main rotor of a helicopter or for any other suitable purpose. A transfer valve 28 is included in a hydraulic manifold 29. Fluid is pumped through the valve 28 to the first stages 16, 18, 20 through pressure lines 30 and return lines 32.

A transfer valve 34 (similar to the valve 28) included in a hydraulic manifold 36, is connected to the second stages 22, 24, 26 through pressure lines 38 and return lines 40. Fluid is pumped and returned through the lines 38, 40 respectively, passing through the valve 34 (in substantially the same way fluid is passed through the valve 28).

The primary fluid supply apparatus for the first stages 16, 18, 20 referred to as the first stage supply apparatus hereinafter comprises a primary pump 39 and a primary reservoir 42. The pressure lines 30 are connected through the valve 28 to the pump 39 through a pressure line 41 for pumping fluid to the first stages 16, 18, 20. The return lines 32 are connected through the valve 28 to the reservoir 42 through a return line 44 for returning fluid from the first stages 16, 18, 20. The returned fluid is transmitted from the reservoir 42 through a suction line 46 to the pump 39.

A primary fluid supply apparatus for the second stages 22, 24, 26 (referred to as the primary second stage supply apparatus hereinafter) is comprised of a primary pump 48 and a primary reservoir 52. The pressure lines 38 are connected through the valve 34 to the pump 48 (which provides substantially the same pressure as the pump 39) through a pressure line 50, for pumping fluid to the second stages 22, 24, 26. The return lines 40 are connected through the valve 34 to the reservoir 52 through a return line 54 for returning fluid from the second stages 22, 24, 26. The returned fluid is transmitted from the reservoir 52 through a suction line 56 to the pump 48.

As explained hereinafter, whenever the primary fluid supply apparatus fails to provide fluid at a pressure above a preselected pressure, the valves 28, 34 respectively select the auxiliary fluid supply apparatus for the first stages 16, 18, 20 and the second stages 22, 24, 26.

An auxiliary fluid supply apparatus is comprised of an auxiliary pump 58 and an auxiliary reservoir 62. The pump 58, which provides substantially the same pressure as the pumps 39, 48 is connected to the valves 28, 34, through pressure lines 60. The reservoir 62 is connected to the valves 28, 34 through return lines 64. When fluid is returned from the valves 28, 34, it is transmitted to the pump 58 from the reservoir 62 through a suction line 66.

According to the present invention, in response to a failure in the primary first stage supply apparatus to supply fluid at a pressure above a preselected pressure, the valve 28 simultaneously blocks the flow of fluid to and from the primary first stage supply apparatus and connects the auxiliary supply apparatus to the first stages 16, 18, 20. In response to a failure of the primary second stage supply apparatus to supply fluid at a pressure above a preselected pressure, the valve 34 simultaneously blocks the flow of fluid to and from the primary second stage supply apparatus and connects the auxiliary supply apparatus to the second stages 22, 24, 26. Typical primary supply failures (that cause connection of the auxiliary supply apparatus) may be a failure of one of the pumps 39, 48, a rupture in one of the lines 41, 44, 50, 54 or a rupture in one of the reservoirs 42, 52.

Figure 2:
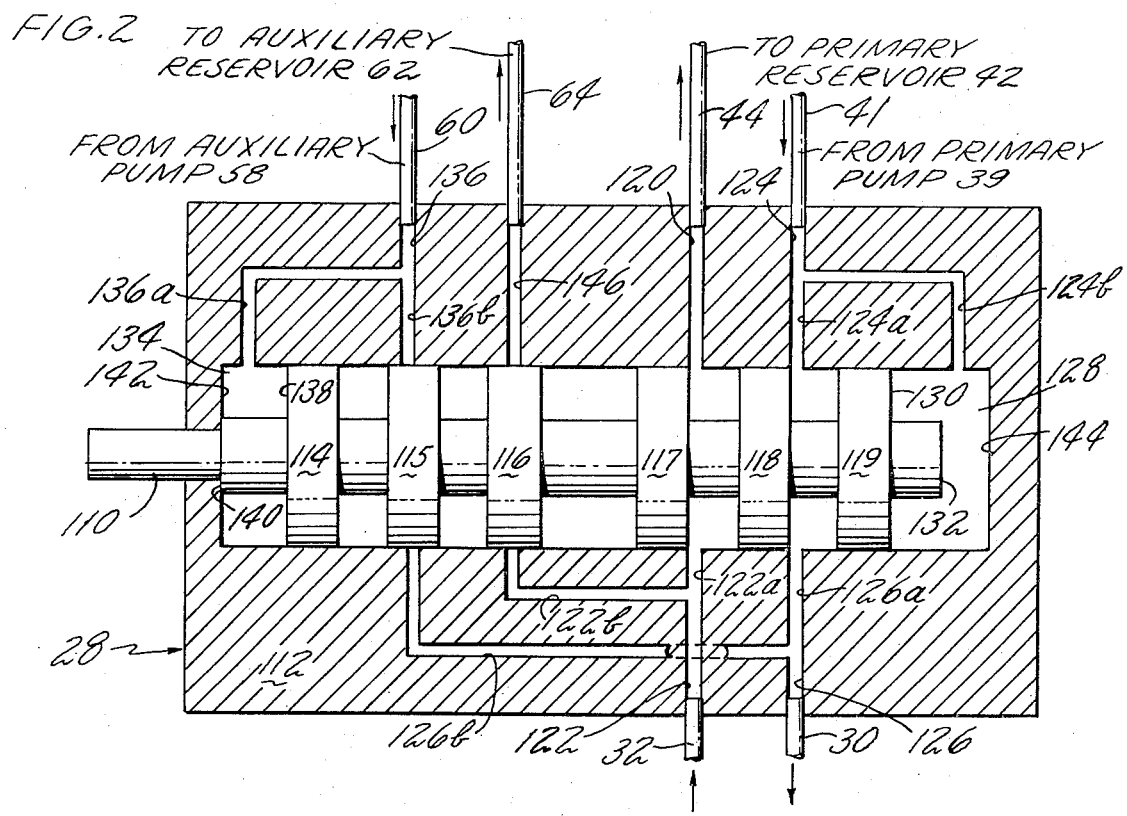
FIG. 2 is a sectioned plan view of a transfer valve for use in the embodiment of FIG. 1 with the spool of the valve in the normal operating position.

Referring now to FIG. 2, the valve 28 includes a spool 110 within a housing 112. The spool 110 is comprised of lands 114–119. Fluid is passed from the return lines 32 to the return line 44 through a passage 120, through an annular orifice formed between the opposing faces of the lands 117, 118 and through passages 122a, 122. The pressure in the return lines 32 is transmitted to the edge of the land 116 through return passages 122, 122b. Since the edge of the land 116 seals the return passage 122b, no fluid flows therethrough.

Fluid is pumped by the pump 39 via the pressure line 41 to the pressure lines 30 via the pressure line 41 through passage 124, 124a, through an annular orifice formed between the opposing faces of the lands 118, 119 and through passages 126a, 126. The pressure in the pressure lines 30 is transmitted to the edge of the land 115 through a passage 126b. Since the edge of the land 115 seals the passage 126b, no fluid flows therethrough.

The pressure line 41 is connected to a valve chamber 128 through the passages 124 and a passage 124b. The fluid pressure provided by the pump 39 is transmitted through the passages 124, 124b and applied within the chamber 128 to a fare 130 of the land 119 and an end face 132 of the spool 110.

Fluid pressure provided by the pump 58 is transmitted to a valve chamber 134 through the pressure line 60 and through passages 136, 136a. The pressure in the valve chamber 134 is applied to a face 138 the land 114 and may be applied to a face 140 of the spool 110. The combined areas of the faces 138, 140 is a smaller area than the combined areas of the faces 130, 132. Because of the difference in areas, the face 140 is made to abut a face 142 of the housing 112 because the substantially equal pressures on the faces 130, 132, 138, 140 cause a greater force (force = pressure X area) on the large combined area than the smaller. A failure of the pump to pump fluid through the pressure line 41 causes a reduction of the pressure within the chamber 128. A failure of the reservoir 42 receive fluid through the line 44 causes a failure of the reservoir 42 to provide fluid through the suction line 46 (FIG. 1) to the pump 39. Since the pump 39 has no fluid to pump, the pressure is reduced within the chamber 128 (FIG. 2). The force applied to the faces 138, 140 causes the spool to move to the right in FIG. 2, whereby the surface 132 abuts a surface 144 of the housing 1.

Figure 3:
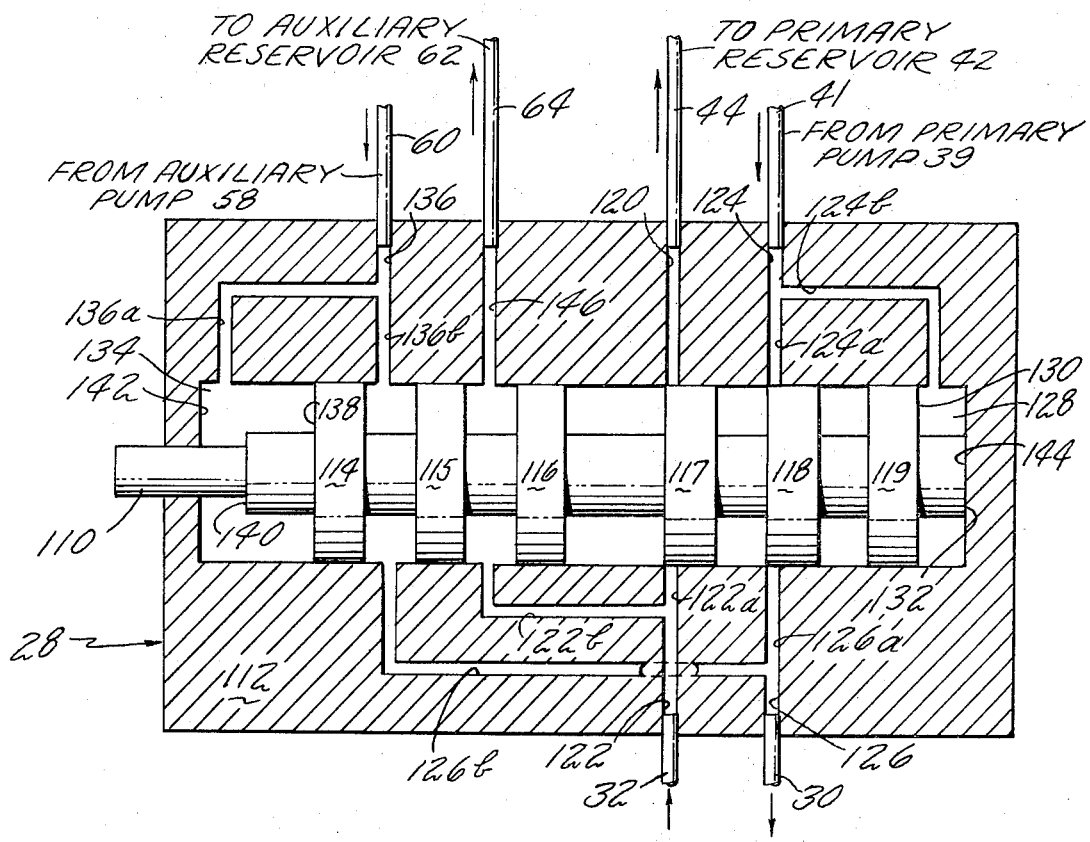
FIG. 3 is a sectioned plan view of the transfer valve of FIG. 2 having the spool in an operating position following a reduction of the hydraulic pressure provided by a primary pump.

Referring now to FIG. 3 the spool 110 is shown in the position with the surface 132 thereof abutting the surface 144. Ends of the passages 124a, 126a are sealed by the edge of the land 1. Ends of the passages 120, 122a are sealed by the edge of the land 117. Fluid is pumped by the pump 58 from the pressre line 60 to the pressure line 30 through the passage 136 and a passage 136b, through an annular orifice formed between the opposing faces of the lands 114, 115 and through the passages 126b, 126. Fluid is passed from the return lines 32 to the return ine 64 through passages 122, 122b, through an annular orifice formed between the opposing faces of the lands 115, 116 and through a passage 146.

The valve 34 operates in a manner similar to the valve 28. The use of two valves allows te auxiliary supply apparatus to take over the functions of either one or both of the primary supply apparatus when either one or both have failed. It should be understood that one auxiliary supply apparatus connected to a plurality of valves can provide fluid in response to a failure of one or more of a plurality of primary supply apparatus.

Although the invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of our invention, that which we claim anew and desire to secure by Letters Patent of the United States is:

1. A hydraulic supply system for maintaining servo power including:
    a first supply pump and a first reservoir connected to a first stage of a tandem servo,
    a second supply pump and a second reservoir connected to a second stage of said servo,
    a first transfer valve between said first supply pump and said servo, and said servo and said first reservoir,
    a second transfer valve between said second supply pump and said servo, and said servo and said second reservoir,
    a third pump and a third reservoir connected to said first and second transfer valves,
    means associated with each transfer valve for connecting its related supply pump and servo stage when supply pump pressure equals or exceeds third pump pressure,
    and means associated with each transfer valve for connecting said third pump to either or both said first and second servo stages when the supply pressure of either or both said related first and second pumps drops below a preselected pressure.

2. A hydraulic supply system in accordance with claim 1 in which each transfer valve includes a spool valve subject to pressure from said third pump and one of said supply pumps and controlling the admission of pump pressure to one stage of said tandem servo.

3. A hydraulic supply system in accordance with claim 1 in which each pump and associated reservoir comprises a supply system completely isolated from other pump and associated reservoir supply systems.

4. A hydraulic supply system for maintaining servo power including:

a first supply pump and a first reservoir connected to a first stage of a tandem servo, a second supply pump and a second reservoir connected to a second stage of said servo, a first transfer valve between said first supply pump and said servo, and said servo and said first reservoir, a second transfer valve between said second supply pump and said servo, and said servo and said second reservoir, a third pump and a third reservoir connected to said first and second transfer valves, means in said first transfer valve for connecting said first supply pump to said servo first stage when said first supply pump pressure exceeds said third pump pressure;

means in said first transfer valve for connecting said third pump to said servo first stage when said first supply pump pressure decreases below said third pump pressure;

means in said second transfer valve for connecting said second supply pump to said servo second stage when said second supply pump pressure exceeds said third pump pressure;

and means in said second transfer valve for connecting said third pump to said servo second stage when said second supply pump pressure decreases below said third pump pressure.

5. A hydraulic supply system in accordance with claim 4 in which the means in said first and second transfer valves is a spool valve.

* * * * *

UNITED STATES PATENT OFFICE
CERTIFICATE OF CORRECTION

Patent No. 3,791,775     Dated February 12, 1974

Inventor(s) Gregory Bochnak, Roderick A. MacLennan

It is certified that error appears in the above-identified patent and that said Letters Patent are hereby corrected as shown below:

| | |
|---|---|
| In the Abstract, line 10, | after "respective" insert --servo-- |
| Column 3, line 44, | "fare 130" should read --face 130-- |
| Column 3, line 49, | after "138" insert --of-- |
| Column 3, line 57, | after "pump" insert --39-- |
| Column 3, line 60, | after "42" insert --to-- |
| Column 4, line 4, | delete "1." insert --118.-- |
| Column 4, line 11, | "ine" should be --line-- |
| Column 4, line 16, | "te" should be --the-- |
| Column 4, line 32, | "anew" should be --as new-- |

Signed and sealed this 23rd day of July 1974.

(SEAL)
Attest:

McCOY M. GIBSON, JR.
Attesting Officer

C. MARSHALL DANN
Commissioner of Patents